United States Patent [19]

Blyth et al.

[11] E Patent Number: Re. 33,365

[45] Reissued Date of Patent: Oct. 2, 1990

[54] STAIN RESISTANT NYLON FIBERS

[75] Inventors: Randolph C. Blyth, Gulf Breeze; Pompelio A. Ucci, Pensacola, both of Fla.

[73] Assignee: Monsanto Company, Pensacola, Fla.

[21] Appl. No.: 396,260

[22] Filed: Aug. 21, 1989

Related U.S. Patent Documents

Reissue of:

[64] Patent No.: 4,680,212
Issued: Jul. 14, 1987
Appl. No.: 914,507
Filed: Oct. 2, 1986

U.S. Applications:

[63] Continuation of Ser. No. 834,804, Mar. 6, 1986, abandoned, which is a continuation-in-part of Ser. No. 643,606, Aug. 23, 1984, abandoned, which is a continuation of Ser. No. 562,370, Dec. 16, 1983, abandoned.

[51] Int. Cl.[5] ..... B32B 27/34

[52] U.S. Cl. ..... 428/97; 428/395

[58] Field of Search ..... 428/97, 375, 378, 392, 428/394, 395; 252/8.7, 8.75, 8.8, 15, 21, 65, 73

[56] References Cited

U.S. PATENT DOCUMENTS

| | | | |
|---|---|---|---|
| 3,118,723 | 1/1964 | Harding | 3/4 |
| 3,178,309 | 4/1965 | Harding | 117/139.5 |
| 3,322,488 | 5/1967 | Freeman | 8/115.5 |
| 3,663,157 | 5/1972 | Gilgien et al. | 8/65 |
| 3,682,582 | 8/1972 | Hirshfeld et al. | 8/18 |
| 3,758,269 | 9/1973 | Bartsch et al. | 8/21 B |
| 3,765,839 | 10/1973 | Mueller et al. | 8/65 |
| 3,849,162 | 11/1974 | Mueller et al. | 117/33.5 |
| 4,030,880 | 6/1977 | Holfeld et al. | 8/15 |
| 4,295,852 | 10/1981 | Walz et al. | 8/560 |
| 4,302,202 | 11/1981 | Sumner et al. | 8/455 |
| 4,317,736 | 3/1980 | Marshall et al. | 252/8.8 |
| 4,325,890 | 4/1982 | Reitz et al. | 260/512 |
| 4,501,591 | 2/1985 | Ucci et al. | 8/495 |

FOREIGN PATENT DOCUMENTS

| | | |
|---|---|---|
| 681618 | 10/1952 | United Kingdom . |
| 1369586 | 10/1974 | United Kingdom . |

OTHER PUBLICATIONS

Ciba-Geigy Brochure, 1975, Germany, Translation Attached.

Cook. C. C., Rev. Prog. Coloration 12, 73-89 (1982).

"The Monsanto Ultron® 3D Technical Dyeing Manual", p. 20, This manual was distributed by Monsanto to its carpet fiber customers sometime during Oct. or Nov. of 1983.

*Primary Examiner*—Marion C. McCamish
*Attorney, Agent, or Firm*—John W. Whisler

[57] ABSTRACT

Nylon carpet fibers are provided which resist staining by acid dye colorants at room temperature, yet are dyeable at elevated temperatures with acid dyes without losing their resistance to acid dye colorants at room temperature. The fibers are characterized by having a coating on the surface thereof comprising one or more selected compounds (stain blockers). Carpets comprising the fibers resist staining when exposed for long periods of time to spills containing acid dye colorants. By also including a fluorochemical in the coating, the carpets can resist such staining even after being subjected to heavy human trafficking.

27 Claims, 3 Drawing Sheets

STAIN RESISTANT NYLON FIBERS

Matter enclosed in heavy brackets [ ] appears in the original patent but forms no part of this reissue specification; matter printed in italics indicates the additions made by reissue.

CROSS-REFERENCE TO RELATED APPLICATION

This application is a continuation of copending application Ser. No. 834,804, filed Mar. 6, 1986 and now abandoned. Application Ser. No. 834,804 is a continuation-in-part of copending application Ser. No. 643,606, filed Aug. 23, 1984, and now abandoned. Application Ser. No. 643,606 is a continuation of application Ser. No. 562,370, filed Dec. 16, 1983, and now abandoned.

BACKGROUND OF THE INVENTION

1. Field of the Invention

This invention relates to nylon fibers having unusual and beneficial dyeing characteristics. More specifically, the invention relates to nylon fibers which resist staining by acid dyes at ambient temperatures and yet are capable of being dyed at elevated temperatures with acid dyes without losing their resistance to staining by acid dyes at ambient temperatures. Conventional nylon fibers can be permanently stained at room temperature by acid dye colorants commonly found in household items, such as beverages, foods, cosmetics, medicines, etc. The nylon fibers of the invention have the ability at room temperature to resist staining normally caused by these colorants and therefore are particularly suited for use in the construction of carpets.

The term fiber as used herein includes fibers of extreme or indefinite length (i.e. filaments) and fibers of short length (i.e. staple). The term yarn, as used herein, means a continuous strand of fibers.

The terms "stain" and "staining" as used herein with reference to nylon fibers means discoloration of such fibers caused by the chemical reaction thereof with a substance such as an acid dye.

2. Description of the Prior Art

Carpet made from nylon fibers is a popular floor covering for both residential and commercial applications. Such carpet is relatively inexpensive and offers a desirable combination of qualities, such as durability, asesthetics, comfort, safety, warmth and quietness. Also, it is available in a wide variety of attractive colors, patterns and textures. However, nylon fibers are severely and permanently stained by certain artificial and natural colorants present in common household items, such as Kool Aid® from nylon fibers is vulnerable to the spilling of such items. The vast majority of these colorants are acid dyes, all of which have been approved by the Food, Drug and Cosmetic Commission for human consumption. One of the most commonly used acid dye colorants and one which most severely stains nylon at room temperature is FD&C Red Dye No. 40 (hereinafter referred to as "Red Dye No. 40"). Red Dye No. 40 (also known as C.T. Food Red 17) has the following structure.

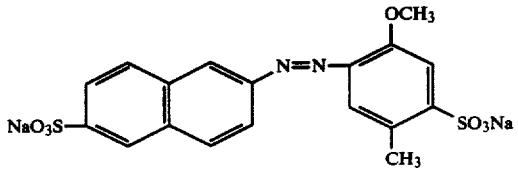

Nylon carpet fibers are often coated with a fluorochemical either before or after the carpet is made for the purpose of improving the antisoiling characteristics of the carpet surface. The fluorochemical reduces the tendency of soil to adhere to the fiber thereby making the removal of soil from the carpet much easier than if the fluorochemical were omitted and, although this fluorochemical treatment also reduces fiber wettability, it offers very little protection to the carpet from spills containing acid dye colorants unless such colorants are immediately removed from the carpet within five to seven minutes. In contrast to substances such as lipstick, shoe polish and motor oil which are capable of being physically removed from nylon carpet by recognized cleaning procedures, acid dye colorants, such as Red Dye No. 40, penetrate and chemically react with nylon to form bonds which make complete removal of such colorants from the nylon fibers impossible; the fibers are actually dyed by these colorants within minutes and, therefore, permanently stained.

Surveys of the carpet replacement market show that more carpets are replaced due to staining than due to wear. Therefore, there is a need in the art to provide nylon carpet fibers from which a more stain-resistant carpet can be made.

SUMMARY OF THE INVENTION

The present invention provides nylon fibers which resist staining by acid dye colorants at ambient temperatures and yet are capable of being dyed at elevated temperatures with acid dyes in a conventional manner without losing their resistance to the acid dye colorants at ambient temperatures. The nylon fibers of the invention are characterized by having a coating on the surface thereof comprising one or more stain blockers in an amount sufficient to provide a fiber having a "dye absorption value", hereinafter defined, at 25° C. of no greater than 7% and at 100° C. of no less than 30%.

The term "stain blocker" as used herein means a chemical compound which when applied to a nylon fiber as a coating in the amount of 0.35% or less, based on the weight of fiber, provides a fiber having a dye absorption value of no greater than 7% at 25° C. and no less than 30% at 100° C.

The fibers of the invention are particularly useful for providing stain resistant nylon carpets. Such carpets can withstand exposure to massive spills of substances containing acid dye colorants, such as red wines and soft drinks, for long periods of time without staining.

According to a preferred embodiment of the invention the coating on the surface of the fiber comprises, in addition to one or more stain blockers, one or more fluorochemicals in an amount sufficient to provide fibers which, when used in the construction of carpet, provides carpet retaining a greater portion of its original stain resistance after being subjected to 30,000 traffics than corresponding carpet from which the fluorochemical is omitted. The term "traffic" as used herein means the occurrence of an individual walking across the carpet. By "original stain resistance" is meant the stain resistance of new carpet before trafficking or any other exposure thereof to wear has occurred. The fluorochemcial by itself does not impart significant stain resistance to nylon fiber nor does the fluorochemical, when used in combination with the stain blocker, provide better stain resistance initially (i.e. before trafficking) than does the stain blocker by itself. Surprisingly, however, the use of one or more fluorochemicals in combination with the stain blocker(s) improves the retention of the original stain resistance imparted to the fiber by the stain blocker.

BRIEF DESCRIPTION OF THE DRAWINGS

FIGS. 3–6 are photographs. Each photograph is of a cut pile carpet sample taken from above. The tufts of each of the carpets were made from nylon yarn. Each carpet was exposed to Red Dye No. 40 for periods of 1, 2, 4, 6 and 8 hours. Each photograph was taken under identical conditions and at a reduction of 2.67 times. The yarn in each carpet is identical, except the fibers of the yarns used to make the carpets shown in FIGS. 3 and 5 were coated in accordance with this invention and the yarns (Control) used to make the carpet shown in FIGS. 4 and 6 were not.

DESCRIPTION OF THE PREFERRED EMBODIMENTS

Figure 1:
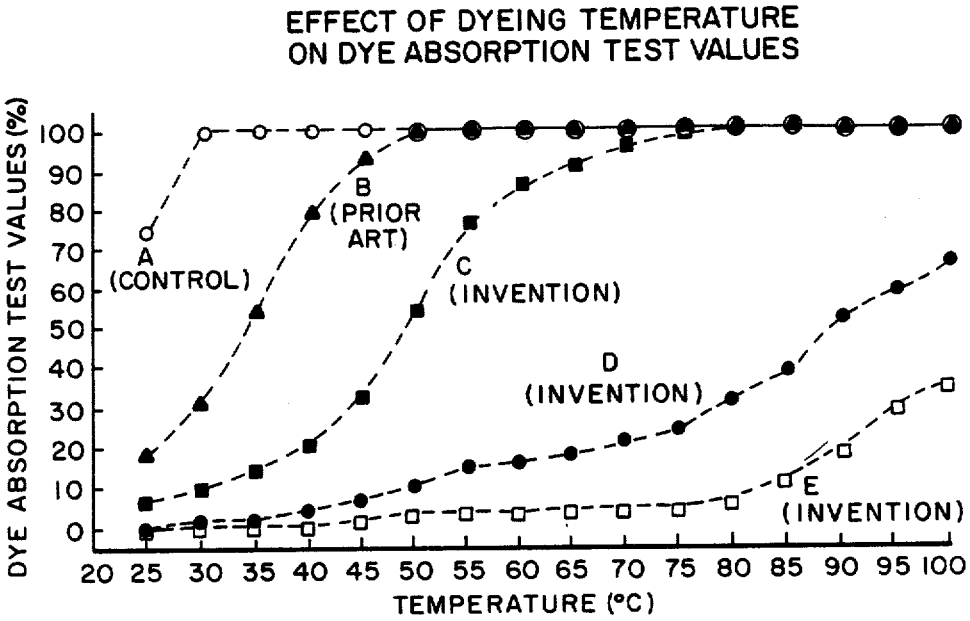
FIG. 1 is a plot showing the effect of temperature on the dye absorption test values of nylon fiber of this invention and of conventional nylon fiber.

Any nylon fiber may be coated in accordance with the present invention. Nylon fibers of commercial importance are those shaped from nylon 66 (polyhexamethylene adipamide) and nylon 6 (polycaprolactam). The invention is particularly useful for providing nylon carpet yarns from which stain resistant carpets can be made. The coating is preferably applied to the nylon fibers from a finish (spin finish) during the melt spinning process used to prepare the fibers. Appropriate amounts of the stain blocker and fluorochemical are incorporated into the finish which typically contains lubricating oils for the fibers as well as dispersants for such oils.

Stain blockers which are particularly useful in practicing thee invention include, by way of example, polymeric condensation products consisting essentially of repeating units of the formula

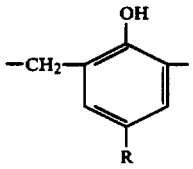

(Formula I)

where R is the same or different in each unit and is hydrogen or a radical selected from the group consisting of —$SO_3X$,

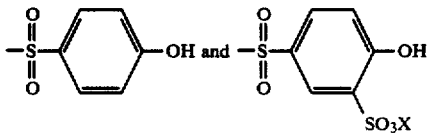

where X is hydrogen or a cation such as sodium or potassium. These condensation products are commercially available and can be prepared by conventional methods in the laboratory. Preferred condensation products of this structure are the water soluble products in which at least 40% of the repeating units contain an —$SO_3X$ radical and at least 40% of the repeating units contain the

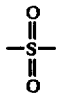

linkage. The molecular weight of the condensation products should be as high as possible while retaining some water solubility and should contain as many monosulfonated phenyl radicals as possible. Such products are conveniently prepared by the condensation of formaldehyde with one or more appropriate phenols (or derivative thereof) such as

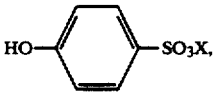

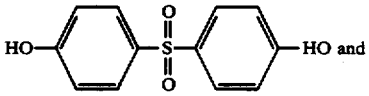

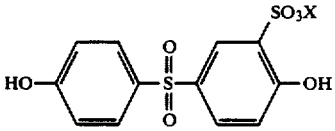

in an acid or alkaline medium at elevated temperatures. Typically, in an acid medium, from 0.3 to 0.5 moles of formaldehyde is used for each mole of phenol and, in a basic medium, from 0.9 to 1.5 moles of formaldehyde is used for each mole of phenol. The water solubility of the condensation product is influenced by the type of terminal groups present in its structure, for example, hydrophylic groups such as —$CH_2OH$ and —$CH_2SO_3H$ render the product more water soluble than groups, such as methyl or phenyl groups. The basic condensation provides products having a greater proportion of terminal —$CH_2OH$ groups and, therefore, greater water-solubility.

Polymeric condensation products consisting essentially of the above-mentioned repeating units can also be prepared by the method wherein diphenolsulfone, after acetylation of its hydroxyl groups, is sulfonated, then hydrolyzed to convert the acetylated hydroxyl groups back to free hydroxyl groups, and finally, reacted with formaldehyde under alkaline or acid conditions. In this instance, reaction conditions are selected to avoid or at least minimize the formation of products containing di-and/or trisulfonated phenyl groups. In general, condensation products in which each repeat unit contains only one —$SO_3X$ radical are more effective stain blockers than corresponding products in which each repeat unit contains two or more —$SO_3X$ radicals. Also, in general, as the ratio of units containing one —$SO_3X$ radical to units containing no —$SO_3X$ radicals increases, the product becomes a more effective stain blocker.

Condensation products of Formula I are commercially available, for example, mixed condensation products of phenol sulfonic acid with dihydroxy diphenolsulfone and formaldehyde are available from Ciba-Geigy Corp. under the tradename of Erional ® PA or from Crompton and Knowles Corp. under the tradename of Intratex ® N.

Also, useful as stain blockers in practicing the present invention are mixed condensation products of naphthalene monosulfolnic acids with dihydroxy diphenylsulfones and formaldehyde. Such a product is sold commercially by Ciba-Geigy Corp. under the tradename of Erional NW.

Fluorochemicals useful in practicing the present invention are those which, when applied as a coating to nylon fiber in combination with a stain blocker, wherein the fluorochemical and stain blocker are applied in amounts sufficient to provide a coating comprising 0.35% by weight of stain blocker and 650 ppm fluorine, based on the weight of fiber, and the fiber is used in the construction of carpet, the carpet retains a greater portion of its original stain resistance after being subjected to 30,000 traffics than if the fluorochemical were omitted from the coating. Such fluorochemicals include, by way of example, those commercially available for use with fibers, such as those commercially available from Minnesota Mining and Manufacturing Company under the tradename of Scotchgard ® (Scotchgard 358 and 352) and from E. I. DuPont de Nemours and Company under the tradenames of Zepel ® and Teflon ®. Typically, these fluorochemicals contain a perfluoroalkyl radical ($R_f$) having from 3 to 20 carbons and is the condensation product of $R_fOH$ or $R_fNH_2$ with a suitable anhydride or isocyanate, for example, the reaction product of N-ethyl perfluorooctyl-sulfonamideoethanol and toluene diisocyanate in a 2:1 mole ratio.

Preferably, the coating on the nylon fiber of this invention comprises from 0.20 to 0.35% by weight (2000 to 3500 ppm) of stain blocker(s), based on the weight of the nylon, and sufficient fluorochemical(s) to provide from 450 to 650 ppm of fluorine, based on the weight of the nylon. The stain blocker(s) and fluorochemical(s) may be applied separately or simultaneously. According to a preferred embodiment of the invention, the stain blocker(s) and fluorochemical(s) are applied simultaneously to the nylon fiber from a finish. According to this embodiment, the stain blocker(s) and fluorochemical(s) are of the same charge, that is, both anionic or cationic, so as to avoid any possibility of precipitation thereof in the finish. The above-mentioned sulfonate-containing stain blockers are anionic and, therefore, it is preferable when using these stain blockers to use anionic fluorochemicals. However, it is possible to select appropriate dispersants so as to form a suitably stable finish containing oppositely charged components.

Selection of an optimum combination of stain blocker(s) and fluorochemical(s) for a particular application can be made from a wide variety of stain blockers and fluorochemicals and the fine tuning of the selection to provide optimum results with a given nylon fiber applied under a set of given conditions can be achieved by routine experimentation within the capabilities of those skilled in the art by merely testing various combinations of components and selecting the combination giving the best results.

Typically, nylon carpet yarn ready for tufting is a two-ply staple or continuous filament yarn which has been subjected to a heat treatment to set the twist in the yarn. The treatment is referred to as heatsetting. Conventionally, the heatsetting operation is accomplished using either Superba equipment in which case the yarn is subjected to steam at about 130°-140° C. or Suessen equipment in which case the yarn is subjected to hot air at about 195°-205° C. The adhesion of the coating on the nylon fiber of this invention is enhanced by subjecting the coated fiber to Suessen heatsetting conditions. Maximum adhesion of the coating of the fiber is achieved when the coating comprises a stain blocker which has terminal groups that can further react during heatsetting with itself or with the nylon surface. Reaction of the terminal groups of the stain blocker with the nylon surface results is covalent linkages. Stain blockers having such groups include those prepared under alkaline conditions.

Preferably, the stain blocker(s) and fluorochemical(s) are selected and applied to the nylon fibers so as to provide fibers having dye absorption test values of 4% or less and, most preferably, of zero or substantially zero (no visible stain) at temperatures up to and including 25° C. and, most preferably, at temperatures up to and including 50° C. and yet have dye absorption test values at 100° C. of at least 30% and, most preferably, of at least 60%.

Dye absorption test values, when given herein, are given in terms of the patent (%) of Red Dye No. 40 absorbed by a fiber sample from an aqueous solution of the dye with reference to the temperature of the solution. The test is accomplished as follows:

(1) An aqueous solution of Red Dye No. 40 in which the concentration of the dye is 0.054 gms/liter is prepared. (This is the concentration of Red Dye No. 40 in cherry Kool Aid when commercialy obtained packaged ingredients are mixed with water according to instructions on the package.)

(2) The light absorption (optical density) of the solution is measured on a Cary 15 Spectrophotometer or equivalent instrument using a ½ cm cell with the measurement being made at 495 millimicrons, the maximum absorptivity for Red Dye No. 40. (Light absorption is a measure of the dye concentration of the solution.)

(3) The light absorption reading is recorded as $T_0$.

(4) Then, 0.25 grams of test fiber is placed into a container containing 14.8 ml of the Red Dye No. 40 solution and the pH of the solution is adjusted to 3 by adding an appropriate amount of Universal Buffer.

(5) The container is then sealed (e.g., stoppered) and shaken for a period of three hours, for example, by means of a motorized shaker at a selected temperature, the temperature being thermostatically controlled.

(6) The fiber is then removed from the solution and the light absorption of the solution is again measured as before.

(7) The reading this time is recorded at $T_1$. (If the fiber sample is not stain resistant, it will take up dye from the solution and the $T_1$ value will be less than the $T_0$ value; on the other hand, if the fiber sample is stain resistant, it will not take up significant dye from the solution and the $T_1$ value will be the same or substantially the same as the $T_0$ value.)

(8) The "Dye Absorption Test Value" at the selected temperature is expressed as a percentage of the $T_0$ value and is calculated as follows:

$$\text{Dye Absorption Test Value (\%)} = \frac{T_0 - T_1}{T_0} \times 100$$

The following examples are given to further illustrate the invention.

EXAMPLE 1

In this example, nylon 66 fibers of the present invention were prepared and tested to demonstrate their resistance to staining.

A 300 filament, 60 denier per filament (dpf), nylon 66 yarn was prepared by extruding fiber-forming nylon 66 of commercial grade at a melt temperature of 282° C. downwardly through the orifices of a 300-hole spinneret into a conventional melt spinning chimney, measuring approximately 1.8 meters in length to form a corresponding number of molten streams. The chimney was adapted to receive a cross-flow of cooling air ambient temperature at a velocity of 270 meters/min. The molten streams solidified in the chimney to form filaments. The filaments were passed from the chimney through a conventional steam conditioning tube measuring about 1.8 meters in length where the filaments were treated with steam. The filaments were passed from the conditioning tube over a conventional metered finish applicator where an aqueous finish containing a stain blocker and fluorochemical in amounts sufficient to provide 3500 ppm of the stain blocker and 650 ppm of fluorine, each based on the weight of fiber, was applied and the filaments converged to form a yarn. The yarn was then passed over and around a driven feed roll (450 meters/min.) and its associated seperator roll with several wraps. The yarn was then collected on a bobbin under a slight tension to facilitate winding of the yarn onto the bobbin. The yarn was then unwound from the bobbin and combined with 54 like yarns to form a tow having a total denier of about 1,000,000. The tow was drawn over rolls to provide nominal 18 dpf tow, crimped in a conventional stuffer box and cut into 7½ inch (19.05 cm) staple. The staple was carded, drafted, spun on a conventional ring spinning frame to provide a 3½ cotton count singles yarn having about 4.5 tpi (177 tpm) of twist in the Z-direction. Two of these yarns were then piled with 4.0 tpi (157 tpm) of twist in the S-direction. A portion of the piled yarn was heatset using normal Suessen heatsetting conditions at 200° C.

The stain blocker (stain blocker A) used in preparing the above heatset and nonheatset yarns consisted essentially of repeating units of the formula

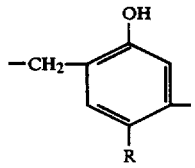

where R is

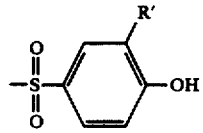

and R′ is —$SO_3Na$ in at least 50% of the units and is hydrogen in the remaining units. The fluorochemical used in preparing these yarns was a mixture of anonic fluorochemicals based on N-ethylperfluorooctyl-sulfonamideoethanol.

Dye absorption test values of a sample of the heatset yarn (Yarn E) and the nonheatset yarn (Yarn D) were determined at the various temperatures indicated in Table 1 below. (The heatset yarn is represented by Curve E and the nonheatset yarn by Curve D in FIG. 1.) Both (Yarn E) and (Yarn D) are considered to be yarns within the scope of this invention.

In another run, heatset and nonheatset yarns (Controls) were prepared in the same manner as described above except in this instance the stain blocker and fluorochemical were omitted from the finish. Dye absorption test values of a sample of the nonheatset Control yarn (Yarn A) were determined and are given in Table I. (This yarn is representative by Curve A in FIG. 1.) A sample of the heatset Control yarn (Conventional nylon carpet yarn) was treated according to the techings of U.S. Pat. No. 3,118,723 by immersing the sample in an aqueous bath containing 2% by weight of acetic acid and 0.5% by weight of Erinoal NW, then bringing the bath to a boil over a period of twenty minutes, holding the bath at the boil for an additional hour, removing the yarn from the bath and then washing and drying the yarn. Dye absorption test values of this yarn (Yarn B) were determined and are also given in Table I. (This yarn is represented by Curve B in FIG. 1.) This treatment of the yarn simulates treatment of carpet where Erional NW is added to the dye bath, as a dye auxiliary (leveling agent or reserving agent), during beck dyeing of the carpet.

A second sample of the nonheatset Control yarn was also treated in accordance with the teachings of U.S. Pat. No. 3,118,723 (Example 1 thereof) in the manner just described. The treated sample was then heatset by heating the sample in an atmosphere of air at 200° C. for a period of one minute and then cooled to ambient temperatures. Dye Absorption Test Values of this treated/heatset yarn (Yarn C) were determined and are also given in Table I below. (This yarn is represented by Curve C in FIG. 1.) Yarn C is considered to be a yarn within the scope of this invention. The treatment of this sample differs from the above treatment (prior art) in that in this instance the sample was treated and then heatset, whereas in the above instance the sample was heatset and then treated.

TABLE I

| DYE-BATH TEMP. C. | DYE ABSORPTION VALUES (%) | | | | |
|---|---|---|---|---|---|
| | INVENTION | | | Control | Prior Art |
| | YARN C | YARN D | YARN E | YARN A | YARN B |
| 25 | 6.4 | 0.0 | 0.0 | 75.3 | 18.1 |
| 30 | 9.6 | 1.6 | 0.0 | 100.0 | 30.9 |
| 35 | 14.1 | 1.6 | 0.0 | — | 54.3 |
| 40 | 20.2 | 4.3 | 0.0 | — | 79.5 |
| 45 | 31.9 | 6.6 | 1.6 | — | 93.1 |
| 50 | 53.2 | 10.1 | 2.7 | — | 100.0 |
| 55 | 76.1 | 14.9 | 3.2 | — | — |
| 60 | 86.2 | 16.2 | 3.7 | — | — |

TABLE I-continued

| DYE-BATH TEMP. C. | DYE ABSORPTION VALUES (%) | | | | |
|---|---|---|---|---|---|
| | INVENTION | | | Control | Prior Art |
| | YARN C | YARN D | YARN E | YARN A | YARN B |
| 65 | 90.4 | 17.6 | 4.3 | — | — |
| 70 | 95.7 | 20.7 | 4.3 | — | — |
| 75 | 99.2 | 23.9 | 4.8 | — | — |
| 80 | 100.0 | 31.4 | 6.1 | — | — |
| 85 | — | 37.8 | 11.7 | — | — |
| 90 | — | 52.1 | 18.6 | — | — |
| 95 | — | 59.0 | 29.8 | — | — |
| 100 | 100.0 | 67.0 | 34.6 | 100.0 | 100.0 |

FIG. 1 is a plot of the data given in Table I. In FIG. 1 Curves A, B and C each terminate at the point defined by the intersection coordinates 100° C. and 100%.

The data shown in Table I and represented in FIG. 1 dramatically demonstrate the exceptional stain resistant properties of the nylon fiber of the present invention as compared to prior art nylon fibers. With reference to FIG. 1, the fibers represented by Curves A and B each were stained at 25° C. to a bright red color and therefore lacked meaningful stain resistance characteristics. The fiber represented by Curve C (Invention) was stained at 25° C. to a lighter shade of pink and, while only marginally acceptable for some carpet yarn applications, was nevertheless significantly more stain resistant than the fibers represented by Curves A and B. Remarkably, the fibers represented by Curves D and E were not stained at all at 25° C.

EXAMPLE 2

This example illustrates the unexpected advantage gained by coating nylon fibers with a fluorochemical and stain blocker. The example shows that carpet made from these fibers retains a greater portion of its original stain resistance after trafficking than corresponding carpet made from nylon fibers coated with only stain blocker.

Thirteen (13) 68 filament, 60 denier per filament (dpf), nylon 66 yarns were prepared. Each yarn was prepared by extruding fiber-forming nylon 66 of commercial grade at a melt temperature of 274° C. downwardly through the orifices of a 68-hole spinneret into a conventional melt spinning chimney, measuring approximately 1.8 meters in length to form a corresponding number of molten streams. The chimney was adapted to receive a cross-flow of cooling air at 18.3° C. at a flow rate of 11.2 $m^3$/min. The molten streams solidified in the chimney to form filaments. The filaments were passed from the chimney through a conventional steam conditioning tube measuring about 1.8 meters in length where the filaments were treated with steam. The filaments were passed from the conditioning tube over a conventional metered finish applicator where an aqueous finish containing a stain blocker and/or a fluorochemical were applied. The stain blocker used in this instance was Erinol PA and the fluorochemical in this instance was Scotchgard FC 358. The level of stain blocker and fluorochemical was varied from yarn to yarn as shown in Table II. Two of these yarns were plied as described in Example and then draw-textured through a texturing machine to yield fibers of about 18 dpf. The resulting two ply yarns were heatset in a Seussen heat setting unit (200° C. for 1 minute). The yarns were used to provide two sets of identical samples each of which contained 13 strips with each strip being tufted with a different yarn. The resulting 26 strips were blank dyed at a 40:1 liquor-to-goods weight ratio using a solution of 2.5 wt. % Calgon on weight of goods (owg), 1.0 wt. % Alkanol ND owg and 2.0 wt. % ammonium sulfate owg. The solution with the strips was then heated to boiling over a 55 minute period and held at the boil with agitation for an additional 60 minutes. The liquor was removed. The strips were then rinsed three times with water, rung through rollers with each rinse to a water pickup of 200% and, finally, allowed to dry 48 hours under ambient conditions.

One set of the blank dyed strips was tested determine the original stain resistance of the different strips. The test consisted of applying 3 drops of an aqueous solution of Red Dye No. 40 at a concentration of 0.054 gms/liter to the surface of each strip (0.054 gms/lt is the concentration of Red Dye No. 40 in cherry Kool Aid which was the solution employed). The solution was worked into the strips by applying pressure with a spatula. A red spot was formed on each strip. (Ten to twenty strokes of the spatula are usually sufficient to assure pentration of the solution into the fibers.) Each strip was then treated in the following manner. Seven more drops of the solution was applied to the spot, worked in with the spatula and left for a period of 10 minutes. At the end of the 10 minute period, the spot was blotted with absorbent paper towels until no further solution could be removed by blotting. The spot was then allowed to dry for 16 hours. Each strip was then cleaned by the following procedure. Four (4) ml. of a carpet cleaning solution was applied to the spot. The cleaning solution had previously been made up by adding 28.4 grams of Steam Clean 300 PG (a commercially available product from Procter and Gamble Co.) to 473 mls. of deionized water. The cleaning solution was left on the spot for 30 seconds and then blotted dry with absorbent paper towels. Then, 4 ml of vinegar (5% acetic acid in deionized water) was applied to the spot and left in contact with the spot for 30 seconds. After the 30 second period, the spot was blotted dry. Then, 4 ml of the carpet cleaner was applied to the spot left for 30 seconds and then blotted dry. Finally, 10 ml of deionized water was applied to the spot and the spot blotted until dry. The strips were then compared to six strips which had been previously staned with Red Dye No. 40 to different degrees of staining ranging from no stain (1) to completely stained (6) where the difference in color between adjacent degrees of staining was substantially the same. The strips were mounted on a board and the test strips were matched to a strip on the board and assigned its number. For numbers less than two, decimal grading is used to denote proximity between 1 and 2. Strips which were assigned a grade of 2 or more were judged not to have significant stain resistance and, therefore, failed the test.

Selected strips of the second set were floor tested for 30,000 traffics and then subjected to the above stain resistance test to determine what effect, if any, trafficking (wear) had on the original stain resistance of the strips. The results of the testing before and after trafficking are given in Table II.

TABLE II

| Yarn Sample | Stain blocker wt. % | Fluorochemical ppm F | Stain Testing Grade | |
|---|---|---|---|---|
| | | | Before Trafficking | After Trafficking |
| 2A1 | 0.08 | — | 5(failed) | not tested |
| 2A2 | — | 200 | 4(failed) | not tested |
| 2A3 | 0.08 | 200 | 3(failed) | 4 |

TABLE II-continued

| Yarn Sample | Stain blocker wt. % | Fluorochemical ppm F | Stain Testing Grade Before Trafficking | After Trafficking |
|---|---|---|---|---|
| 2B1 | 0.16 | — | 4(failed) | not tested |
| 2B2 | — | 400 | 2(failed) | not tested |
| 2B3 | 0.16 | 400 | 1.2 | 3 |
| 2C1 | 0.24 | — | 1.8 | 4 |
| 2C2 | — | 600 | 1.5 | 4 |
| 2C3 | 0.24 | 600 | 1.1 | 2 |
| 2D1 | 0.32 | — | 1.2 | 4 |
| 2D2 | — | 800 | 1.4 | 4 |
| 2D3 | 0.32 | 800 | 1.0 | 1.6 |
| Control | — | — | 6(failed) | not tested |

Figure 2:
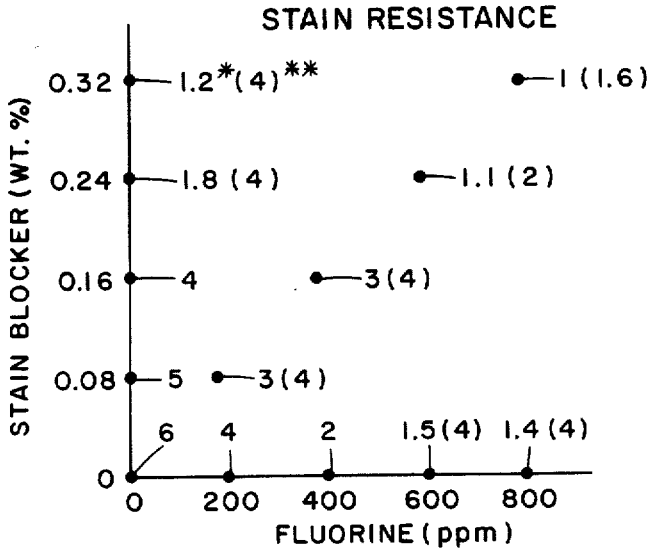
FIG. 2 is a plot showing the effects of stain blocker and fluorochemical on the stain resistance of nylon fiber before and after trafficking.

FIG. 2 is a plot of the data given in Table II. In FIG. 2 stain grading numbers not enclosed by parentheses are determined before trafficking(*) and those enclosed by parentheses are determined after trafficking(**).

The results given in Table II and shown in FIG. 2 clearly show that the nylon fibers coated with stain blocker and fluorochemical (e.g. 2D3) retained a greater portion of their original resistance after trafficking than corresponding fibers from which the fluorochemical was omitted (2D1). The results also show the effect of stain blocker and fluorochemical concentrations on stain resistance.

EXAMPLE 3

In this example nylon fibers were coated with fluorochemical or stain blocker or a combination thereof and then tested for stain resistance.

Plied yarns were prepared as described in Example 1, except in one instance the finish contained neither stain blocker A nor fluorochemical (Control Yarn); in another instance the finish contained stain blocker A and no fluorochemical (S.B. Yarn); in yet another instance the finish contained fluorochemical and no stain blocker (F.C. Yarn); and in still another instance the finish contained both stain blocker A and fluorochemical (S.B.+F.C. Yarn). The fluorochemical used in this instance was the same as that used to prepare the yarn described in Example 1.

The stain blocker and fluorochemical, when present in the finish, were present in amount sufficient to provide 3500 ppm of the stain blocker and 650 ppm of fluorine on the yarn, based on the weight of yarn. All the yarns were heatset at 200° C. using normal Suessen heatsetting conditions. Dye absorption test values of a sample of each yarn were determined at 30° C. and at 100° C. and are given in the following Table.

TABLE III

| Yarn | Dye Absorption Test Values, (%) 30° | 100° |
|---|---|---|
| Control | 85 | 100 |
| S.B. | 5 | 68 |
| S.B. + F.C. | 5 | 63 |
| F.C. | 73 | 100 |

The results in Table II show that the fluorochemical by itself did not impart significant stain resistance to nylon fiber. The results further show that the fluorochemical when used in combination with the stain blocker did not improve the stain resistance of the stain blocker, thereby confirming the results given in Example 2 that the value of the combinations is in retaining original stain resistance after trafficking, i.e., durability of stain resistance.

EXAMPLE 4

Two 3½ cotton singles yarns were prepared as described in Example 1 except that in this instance the stain blocker was Intratex N and the yarns were not individually heatset. A fluorochemical was not used. The yarns were plied on a conventional ring twister with 3 tpi (118 tpm) of twist in the S-direction. The resulting plied yarn was then heatset using Suessen heatsetting conditions at 200° C. Cut pile tufted carpet samples were made from the heatset plied staple yarn and dyed to a light gold color. Light gold was selected as being a color which contrasts well with most stains.

The carpet samples were subjected to the common household liquid substances in the table below to determine the resistance of the sample to staining by colorants present in these substances. Each substance was applied to the carpet sample, rubbed into the carpet, left on the sample overnight and, finally, the next day the sample was washed to remove the substance, first with a dilute water solution of a commercial detergent and then with water. For purposes of comparison, carpet samples (control) were made in the same manner described above except in this instance the yarns from which the samples were made were not treated with Intratex N, that is, Intratex N was omitted from the finish.

TABLE IV

Staining Results

| Substance | Carpet Samples Invention | Control |
|---|---|---|
| Coffee/Cream/Sugar | Removed | Stained |
| Red Wine | Removed | Stained |
| Soft Drink w/Red Dye No. 40* | Removed | Stained |
| Cola | Removed | Removed |
| Watercolor | Removed | Removed |
| Mustard w/out Tumeric | Removed | Removed |
| Mustard w/Tumeric | Stained | Stained |

*a soft drink was prepared by dissolving cherry Kool Aid premix ingredients in the recommended amount of water.

The results in the Table clearly show that the nylon fibers treated in accordance with the present invention had excellent stain resistance, whereas corresponding fibers which were not so treated lack stain resistance.

It was observed that the exposed cut ends of the pile fibers of the carpet samples prepared from fibers of the invention were stain resistance, thereby demonstrating that the stain blocker not only coated the surface of the fibers but also impregnated the fibers.

EXAMPLE 5

Of the staining substances tested in Example 4, the substance which most severly stained the untreated (control) carpet samples was the soft drink (cherry Kool Aid) containing Red Dye No. 40. A separate test was then conducted to determine the effect of a massive spill of this soft drink on a carpet sample made from nylon 66 fibers of the present invention. In this test, a gallon (385 ml) of the soft drink was poured onto an appropriate carpet sample from a gallon milk container the container being held at a height of one meter above the face of the carpet sample. The concentration of the dye in the soft drink was 0.054 gms/liter. The carpet sample was made in the manner described in Example 2, except half of the sample was made from yarn, the fibers of which were treated with Intratex N, and the other half (control) from corresponding yarn, the fibers which were not treated with Intratex N. The soft drink was poured onto both halves of the carpet sample from a distance of about one meter above the carpet sample with an attempt being made to pour the same amount on each half. The soft drink was left on the sample overnight with no steps being taken to clean the carpet or remove any of the soft drink until the next day. The next day the carpet sample was cleaned in the manner described above. Surprisingly, after being cleaned, no visible evidence of the soft drink (Red Dye No. 40) remained on that half of the carpet sample prepared from fibers of the present invention, whereas the other half of the carpet sample was badly stained.

Similar results were obtained when the stain blockers used in Examples I and II were substituted for the stain blocker used in this example.

EXAMPLE 6

In this example, two nylon carpet yarns were prepared, one in accordance with the present invention (stain-blocked yarn) and one in accordance with state-of-the-art techniques (control yarn). The yarns were then processed identically and each made into a cut pile carpet with both carpets being the same except one was made using stain blocked yarn and the other was made using control yarns. The carpets were then tested for stain resistance before and again after trafficking.

The yarn of the present invention (stain-blocked yarn) was made in the following way.

A 300 filament, 60 denier filament (dpf), nylon 66 yarn was prepared by extruding fiber-forming nylon 66 of commercial grade at a melt temperature of 282° C. downwardly through the orifices of a 300-hole spinneret into a conventional melt spinning chimney, measuring approximately 1.8 meters in length, to form a corresponding number of molten streams. The chimney was adapted to receive a cross-flow of cooling air at ambient temperature at a velocity of 270 meters/min. The molten streams solidified in the chimney to form filaments. The filaments were passed from the chimney through a conventional steam conditioning tube measuring about 1.2 meters in length where the filaments were treated with steam. The filaments were passed from the conditioning tube over a conventional metered finish applicator where an aqueous finish containing a stain blocker and fluorochemical in amounts sufficient to provide 3500 ppm of the stain blocker and 650 ppm of fluorine, each based on the weight of fiber, was applied and the filaments converged to form a yarn. The yarn was then passed over and around a driven feed roll (450 meters/min.) and its associated separator roll with several wraps. The yarn was then collected on a bobbin under a slight tension to facilitate winding of the yarn onto a bobbin. The yarn was then unwound from the bobbin and combined with 54 like yarns to form a tow having a total denier of about 1,000,000. The tow was drawn over rolls to provide nominal 18 dpf tow, crimped in a conventional stuffer box and cut into 7½ inch (19.05 cm) staple. The staple was carded, drafted, and spun on a conventional ring spinning frame to provide a 3½ cotton count singles yarns having about 4.5 tpi (177 tpm) of twist in the Z-direction. Two of these yarns were then plied with 4.0 tpi (157 tpm) of twist in the S-direction. The stain blocker and fluorochemical used in preparing this yarn were the same as those used to prepare the yarns described in Example 1.

The Control yarn was made in the same manner just described, except that the stain blocker and fluorochemical were omitted from the finish.

Both yarns were heatset using normal sluessen heat-setting conditions at 200° C. A carpet of saxony construction was made from each yarn. Each yarn was tufted on a 5/32 gauge cut pile tufting machine into a primary backing using 7 stitches per inch (27.6 stitches per 10 cm). The pile height was ⅞ in (2.2. cm) and 32 oz of yarn were used per square yard of carpet. Each carpet was dyed in a beck to a light beige shade of color. A secondary backing was applied with an adhesive to the primary backing. Each carpet was subjected to the following tests.

A sample of each carpet was tested to determine its resistance to Red Dye No 40 before trafficking. An aqueous solution of the dye at a concentrate of 0.054 gms/lt. (cherry Kool Aid) was prepared as described in Example 4 and used in the testing of the carpet samples. Five open-ended cylinders having an inside diameter of 2.54 cm and measuring 10 cm in length were placed vertically on each carpet sample. Twenty (20) ml of the Red Dye No. 40 solution was poured into each of the cylinders at the time intervals shown below:

cylinder 1 at $t_o$ (beginning)
cylinder 2 at $t_o+2$ hours
cylinder 3 at $t_o+4$ hours
cylinder 4 at $t_o+6$ hours
cylinder 5 at $t_o+7$ hours At the end of eight hours ($t_o+8$), all the cylinders were removed from the carpet samples and the spots were blotted with paper towel to remove excess solution. The spots on each carpet sample were then graded on a scale of 1 to 8 with 1 being severely stained carpet and 8 being no visible stain on the carpet. Each carpet sample was in contact with the Red Dye No. 40 solution for periods of 1, 2, 4, 6 and 8 hours. Each time period solution corresponded to one of the spots on the carpet sample. The results of the testing is given in Table V.

TABLE V

| | Before Trafficking Stain Testing Grade on a Scale of 1 to 8* | |
|---|---|---|
| Spot | Invention | Control |
| 1 hour | 8.0 | 3.0 |
| 2 hours | 8.0 | 2.5 |
| 4 hours | 8.0 | 2.0 |
| 6 hours | 8.0 | 1.0 |
| 8 hours | 8.0 | 1.0 |
| Average | 8.0 | 1.9 |

*1 designates severely stained
8 designates no visible stain

A second sample of each carpet was subjected to 128,000 traffickings and then tested in the manner just described. The results of this test is given in Table VI.

TABLE VI

| | After 128K Traffics Stain Testing Grade on a Scale of 1 to 8* | |
|---|---|---|
| Spot | Invention | Control |
| 1 hour | 8.0 | 3.0 |
| 2 hours | 7.0 | 2.0 |
| 4 hours | 6.0 | 1.0 |
| 6 hours | 5.0 | 1.0 |
| 8 hours | 5.0 | 1.0 |
| Average | 6.2 | 1.6 |

*1 designates severely stained
8 designates no visible stain

FIG. 3 is a photograph of the carpet made from the stain blocked yarn (Invention) before trafficking and after being subjected to the staining test. FIG. 4 is a photograph of the carpet made from the Control yarn before trafficking and after being subjected to the staining test. FIG. 5 is a photograph of the carpet made from the stain blocked yarn (Invention) after being first subjected to 128,000 trafficking and then to the staining test. FIG. 6 is a photograph of the Control yarn after being subjected first to 128,000 traffickings and then to the staining test.

The results given in Tables V and VI and shown in FIGS. 3–6 clearly illustrate the unusual and beneficial stain resistant characteristics of the fiber of the invention. In FIGS. 3 and 4 the expression "original" means before trafficking and in FIGS. 5 and 6 the expression "soiled" means after trafficking. The results show that the fibers coated in accordance with the invention were substantially stain proof with respect to Red Dye No. 40, even after enduring 128,000 traffics, whereas when the coating was omitted from the fibers, the fibers virtually had no protection from the dye. It is remarkable that the carpet made from the fibers of the invention was not stained at all before trafficking and stained very little after trafficking even though the dye was left in contact with the carpet for periods of up to eight hours. This corresponds, for example, to a small child spilling a soft drink and the spill going unnoticed for an extended period of time. Such an incident is not uncommon in the typical household.

I claim:

1. An undyed stained resistant nylon fiber characterized by having a coating on the surface thereof comprising one or more stain blockers in an amount sufficient to provide a fiber having a dye absorption test value at 25° C. of [no greater than 7%] *substantially zero* and a dye absorption value at 100° C. of no less than 30%.

2. The fiber of claim 1 wherein the nylon is nylon 66.

3. The fiber of claim 1 wherein the denier of said fiber is in the range of 8 to 24.

4. The fiber of claim 3 in staple form.

5. The fiber of claim 3 in continuous filament form.

6. A yarn composed of the fibers of claim 4.

7. A yarn composed of the fibers of claim 5.

[8. The fiber of claim 1 wherein said dye absorption value at 25° C. is substantially zero.]

9. The fiber of claim 1 wherein said coating also comprises one or more fluorochemical(s) in an amount sufficient to provide fiber having the ability when made into carpet of retaining a greater portion of its original stain resistance after trafficking than if the fluorochemical were omitted from the coating.

10. The fiber of claim 1 wherein said stain blockers are polymeric condensation products consisting essentially of repeating units of the formula

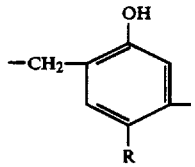

where R is the same or different in each unit and is hydrogen or a radical selected from the group consisting of —$SO_3X$,

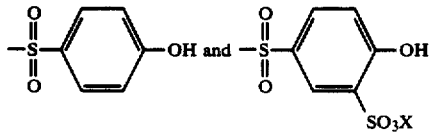

where X is hydrogen or a cation, wherein at least 40% of said repeating units contain an —$SO_3X$ radical and at least 40% of the repeating units contain the

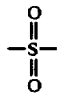

linkage.

11. The fiber of claim 10 wherein said condensation products are mixed condensation products of phenol sulfonic acid with dihydroxy diphenolsulfone and formaldehyde.

12. The fiber of claim 1 wherein said stain blockers are mixed condensation products of naphthalene monosulfonic acids with dihydroxy diphenylsulfones and formaldehyde.

13. A carpet having a pile consisting essentially of fibers of claim 1.

14. The carpet of claim 13 wherein the carpet is of a cut pile construction.

15. The carpet of claim 14 wherein the fibers are nylon 66 fibers.

16. An undyed nylon fiber characterized by having a coating on the surface thereof comprising one or more stain blockers in an amount sufficient to provide a fiber having dye absorption test values within the range represented by the area under Curve C and above Curve E in FIG. 1.

17. A carpet having a pile consisting essentially of fibers of claim 16.

18. The carpet of claim 17 wherein the fibers are nylon 66 fibers.

19. An undyed nylon fiber characterized by having a coating on the surface thereof comprising one or more stain blockers in an amount sufficient to provide a fiber having dye absorption test values within the range represented by the area under Curve D and above Curve E in FIG. 1.

20. A carpet having a pile consisting essentially of fibers of claim 19.

21. The carpet of claim 20 wherein the fibers are nylon 66 fibers.

22. A process for improving the ability of nylon fibers to resist staining at room temperature by acid dyes while retaining their ability to be dyed with acid dyes at elevated temperatures which comprises applying a spin finish to said fibers during the melt polymerization process by which said fibers are prepared, said finish being characterized in containing one or more stain blocker(s) in an amount sufficient to provide a nylon fiber having a dye absorption value at 25° C. of [no greater than 7%] *substantially zero* and a dye absorption value at 100° C. of no less 30%.

23. The process of claim 22 wherein the nylon is nylon 66.

24. The process of claim 22 wherein said finish contains, in addition to one or more stain blockers, one or more fluorochemicals.

25. The process of claim 24 wherein the stain blocker(s) and fluorochemical are present in amounts sufficient to provide fiber coated with from 0.20 to 0.35% by weight of the stain blocker and from 450 to 650 ppm of fluorine, based on the weight of nylon.

26. The process of claim 22 wherein said stain blockers are polymeric condensation products consisting essentially of repeating units of the formula

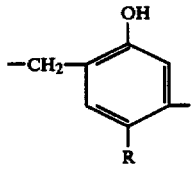

where R is the same or different in each unit and is hydrogen or a radical selected from the group consisting of —$SO_3X$,

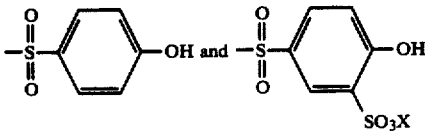

where X is hydrogen or a cation, wherein at least 40% of said repeating units contain an —$SO_3X$ radical and at least 40% of the repeating units contain the

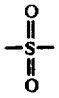

linkage.

27. The process of claim 26 wherein said condensation products are mixed condensation products of phenol sulfonic acid with dihydroxy diphenolsulfone and formaldehyde.

28. The process of claim 22 wherein said stain blockers are mixed condensation products of naphthalene monosulfonic acids with dihydroxy diphenylsulfones and formaldehyde.

* * * * *